United States Patent
Bourgart

(10) Patent No.: US 7,076,175 B2
(45) Date of Patent: Jul. 11, 2006

(54) METHOD OF SETTING UP TWO-WAY OPTICAL COMMUNICATION BETWEEN A CENTRAL UNIT AND A REMOTE UNIT

(75) Inventor: Fabrice Bourgart, Perros-Guirec (FR)

(73) Assignee: France Telecom, Paris (FR)

( * ) Notice: Subject to any disclaimer, the term of this patent is extended or adjusted under 35 U.S.C. 154(b) by 687 days.

(21) Appl. No.: 09/783,630

(22) Filed: Feb. 14, 2001

(65) Prior Publication Data
US 2001/0026382 A1    Oct. 4, 2001

(30) Foreign Application Priority Data
Feb. 15, 2000   (FR)   .................................. 00 01924

(51) Int. Cl.
*H04B 10/00* (2006.01)
(52) U.S. Cl. .................... 398/167.5; 398/167; 398/168
(58) Field of Classification Search ................. 398/41, 398/167.5, 154, 44, 162, 72; 709/236, 232; 370/342, 509, 276–296; 375/368
See application file for complete search history.

(56) References Cited

U.S. PATENT DOCUMENTS

| | | | |
|---|---|---|---|
| 4,720,827 A | | 1/1988 | Kanaji |
| 5,050,952 A | * | 9/1991 | FussgaKurt ................. 398/44 |
| 5,111,451 A | | 5/1992 | Piasecki et al. |
| 5,305,306 A | | 4/1994 | Hawe et al. |
| 5,459,607 A | * | 10/1995 | Fellows et al. ............. 398/154 |
| 5,475,519 A | * | 12/1995 | Kragl et al. ................. 398/168 |
| 5,526,346 A | * | 6/1996 | Abiven ........................ 370/295 |
| 5,550,666 A | * | 8/1996 | Zirngibl ........................ 398/72 |
| 5,608,734 A | * | 3/1997 | Sandler et al. .............. 370/509 |
| 5,617,419 A | * | 4/1997 | Christensen et al. ........ 370/471 |
| 5,818,826 A | * | 10/1998 | Gfeller et al. .............. 370/342 |
| 6,381,647 B1 | * | 4/2002 | Darnell et al. .............. 709/232 |
| 6,643,469 B1 | * | 11/2003 | Gfeller et al. .............. 398/162 |
| 2002/0112068 A1 | * | 8/2002 | Murphy ....................... 709/236 |

FOREIGN PATENT DOCUMENTS

EP           0 821 502 A       1/1998

* cited by examiner

*Primary Examiner*—David C. Payne
(74) *Attorney, Agent, or Firm*—Cohen, Pontani, Lieberman & Pavane

(57) ABSTRACT

A method of setting up two-way optical communication between a central unit and a remote unit suitable for operating in a given communication mode selected from a plurality of communication modes. A plurality of frame patterns is defined in the central unit, with each frame pattern being appropriate to one of the communication modes. The plurality of frame patterns are sent sequentially until a coherent response is obtained from the remote unit, the communication mode of the remote unit being the mode which corresponds to the frame pattern which gave rise to the coherent response.

12 Claims, 3 Drawing Sheets

METHOD OF SETTING UP TWO-WAY OPTICAL COMMUNICATION BETWEEN A CENTRAL UNIT AND A REMOTE UNIT

FIELD OF THE INVENTION

The present invention relates to setting up two-way optical communication between a central unit and a remote unit. A particularly advantageous application of the invention lies in the field of optical fiber telecommunications, and more specifically the field of access networks of the point-to-point type.

BACKGROUND OF THE INVENTION

At present, in optical fiber telecommunications, access networks are known in which a given central unit is connected to a remote unit situated at the premises of a given customer. That type of technology is known as "point to point" in contrast to "point-to-multipoint" technology in which a central unit can be connected on its customer side to a plurality of remote units. Although the invention preferably relates to point-to-point transmission, it can also be applied in the context of point-to-multi-point transmission, in particular passive optical network (PON) type transmission.

The communication mode that is used most commonly in point-to-point technology is simultaneous communication mode, also known as "simplex" mode which makes use of one optical fiber for each transmission direction.

Until now, telecommunications operators, in particular those using optical fibers, have had control over both ends of the transmission link, i.e. the central unit and the remote unit, and both units were installed or withdrawn simultaneously. For operators this situation implied a degree of technological stability and inalienable rights over their customers and their units.

Nowadays, the context in which operators operate has been changed considerably because of the changes that have taken place in optoelectronic component technology, because of the introduction of competition on the optical fiber telecommunications market, and because of the appearance of new techniques such as wavelength division multiplexing (WDM). In outline, WDM differs from the techniques previously used on optical fiber access networks in that known techniques presently in use implement one or two wavelengths selected in spectral windows centered around 1.3 µm or 1.5 µm between the central unit and all of the remote customer units, with the optoelectronic components in the various units being of the broadband type, whereas with the WDM technique at least the window at the central unit, preferably around 1.5 µm, is subdivided into a plurality of carrier wavelengths, each being allocated to a particular remote unit. For example, in dense wavelength division multiplexing (DWDM), the window around 1.5 µm which extends from 1.48 µm to 1.58 µm is subdivided into 64 carrier wavelength channels. In practice, each remote unit can be provided with a filter centered on the channel that is allocated thereto while the central unit has one or more tunable lasers suitable for emitting at each carrier wavelength.

A consequence of this new situation has been to oblige operators to provide for a degree of interoperability between their own central units and the remote units of their customers. This interoperability also presents numerous advantages in particular since it makes it possible to lower the price of components by putting manufacturers into competition and it makes it possible to diversify sources of supply. Furthermore, interoperability makes it easier to introduce new techniques such as WDM. Finally, because of the independence that is obtained between units, the operator is no longer responsible for day-to-day management of all of the units at both ends of the link nor is there any need to maintain consistency when replacing some of the units only.

Nevertheless, interoperability assumes that central units and remote units can be connected independently of the identities of the manufacturers and of their particular design decisions. Unfortunately, although an operator remains in charge of central units, the operator's knowledge about remote units that are to be connected to the network is not necessarily completely reliable, particularly as concerns their communication modes.

OBJECTS AND SUMMARY OF THE INVENTION

One object of the present invention is to provide a method of setting up two-way optical communication between a central unit and a remote unit that is capable of operating in a given communication mode selected from a plurality of communication modes, that enables the central unit to detect "blind", i.e. without human intervention, the type of remote unit to which it is connected, so as to be able to interface with as large as possible a number of technological variants concerning the implementation of remote units, and that is capable of adapting to new techniques such as WDM.

This and other objects are attained in accordance with the present invention one aspect of which is directed to a method that comprises defining a plurality of frame patterns in the central unit, with each frame pattern being appropriate to one of said communication modes; and sending said plurality of frame patterns sequentially until a coherent response is obtained from said remote unit, the communication mode of the remote unit being the mode which corresponds to the frame pattern which gave rise to said coherent response.

Thus, the method of the invention enables the central unit to recognize the communication mode of the remote unit automatically at the beginning of transmission so as to determine which frame pattern should be used throughout the transmission.

The invention thus achieves compatibility that is as broad as possible between the two ends of the communications link and complete adaptability to existing and future technologies such as WDM without it being necessary to develop new electronics for the central unit at each stage of technological evolution.

Naturally, the method of the invention applies to all communications modes. Provision is made in particular for the plurality of communications modes to comprise modes involving simultaneous communication and modes involving alternating communication. By way of example, simultaneous communication modes comprise simplex, full duplex, and diplex modes, while alternating communication modes comprise half-duplex and part-duplex modes.

In an implementation of the invention that is described in greater detail below, the frame pattern appropriate to simultaneous communication modes is constituted by a complete frame without transmission interruption, the reply of the remote unit then being a frame that is sent asynchronously.

Similarly, the invention provides for the frame structure appropriate to alternating communication modes to be constituted by a frame in which transmission is interrupted in order to enable the remote unit to send between an interruption in transmission from the central unit and the end of the frame. In a particular case, where the remote unit is a reflection modulator, the frame is constituted, after transmission has been interrupted, by a constant level for being modulated and reflected by said remote unit.

When the WDM technique is applied, the central unit must send at a wavelength which has been allocated to each remote unit. Unfortunately this wavelength is not necessarily known to the system when it is put into operation. It is therefore advantageous to include in the method of the invention a procedure for searching automatically for the wavelength allocated to the remote unit with which the central unit seeks to communicate. For this purpose, two possible implementations are provided.

In a first implementation, for remote units distinguished by wavelength, the step of sending the plurality of frame patterns sequentially is performed successively at each remote unit wavelength until said coherent response is obtained.

In a second implementation, for remote units distinguished by wavelength, the step of sending the plurality of frame patterns sequentially is performed successively at each remote unit wavelength for each frame pattern until said coherent response is obtained.

DETAILED DESCRIPTION OF THE DRAWINGS

Figure 1A:
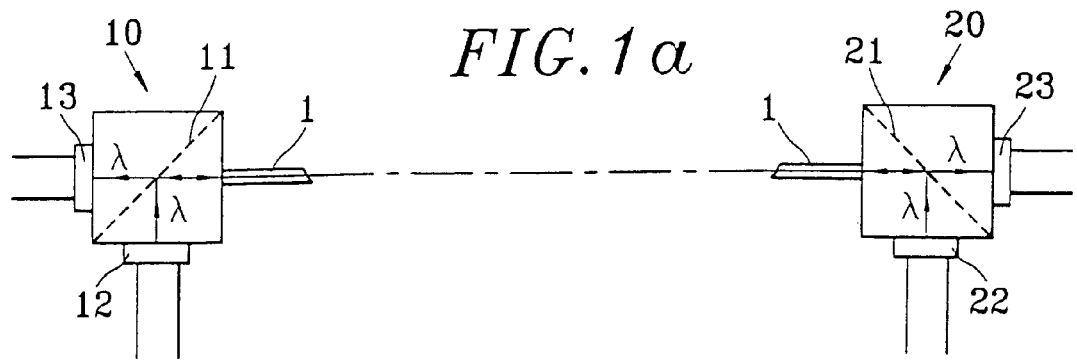
FIG. 1a is a diagram of a first embodiment of an optical link between a central unit and a remote unit.

FIG. 1a shows an optical fiber link 1 between a central unit 10 and a remote unit 20. In this example, the units 10 and 20 are of the duplex type. Each is constituted firstly by a respective emitter 12 or 22, said emitters preferably being laser diodes of wavelength $\lambda$, and secondly by a respective detector 13, 23, said detectors being constituted in particular by photodiodes that are sensitive to the wavelength $\lambda$. As shown in FIG. 1a, light rays emitted and received by each unit are separated by respective semireflecting plates 11, 21.

Duplex type units as shown in FIG. 1a are well adapted to alternating communication modes such as half-duplex and its variant part-duplex. Half-duplex mode consists in beginning by sending information over the fiber 1 to the remote unit 20, and then by sending information to the central unit 10. This communication mode requires a speed of transmission that is not less than twice that required for transmitting information in one direction since it is also necessary to take account of propagation time over the fiber 1. Providing the central unit 10 is capable of sending and receiving simultaneously, part-duplex mode makes it possible to ignore propagation time. To do this, it is necessary on initializing the link to calculate the propagation time between the two units 10 and 20 and to adapt the sending of information in such a manner as to ensure that operation at the inlet of the remote unit 20 is exclusively alternating.

The duplexer of FIG. 1a can also be used for the full-duplex simultaneous communication mode providing the detectors 13, 23 are not blinded by their own emitters 12, 22.

Figure 1B:
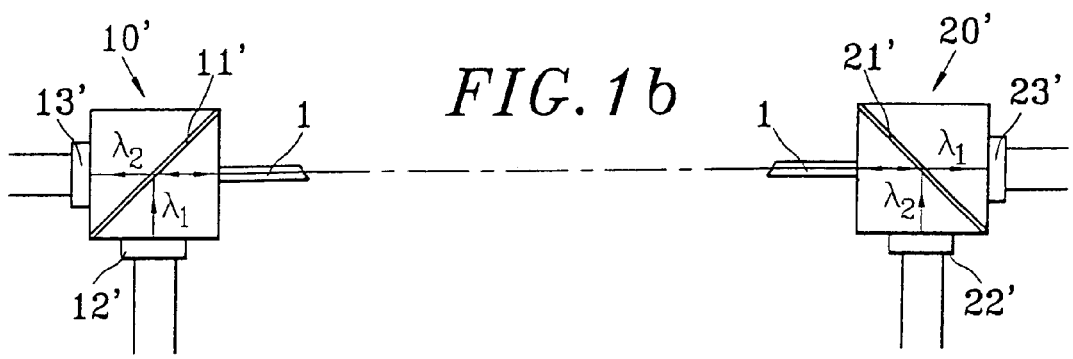
FIG. 1b is a diagram of a second embodiment of an optical link between a central unit and a remote unit.

FIG. 1b shows a variant of the FIG. 1a duplexer that is known as a diplexer. This variant uses a single optical fiber 1 to convey a wavelength $\lambda 1$ in one transmission direction and a wavelength $\lambda 2$ in the other transmission direction. This component is thus well suited to simultaneous communication mode which is referred to as diplex mode in this case. In the example of FIG. 1b, sending and receiving wavelengths are separated by dichroic filters 11' and 21' that replace the semireflecting plates 11, 21 of FIG. 1a. In application of the ETSI and ITU-T standards, the wavelengths $\lambda 1$ and $\lambda 2$ of the central unit 10' and of the remote unit 20' are selected respectively to lie in a window around 1.5 µm and in a window around 1.3 µm.

The diplexer of FIG. 1b is also compatible with the WDM technique which uses a wavelength selected in a window around 1.3 µm at the remote unit and, at the central unit, a plurality of wavelengths selected from the window around 1.5 µm, which window presents minimum loss per kilometer of optical fiber and greater availability of optical amplifiers in this window only. Each remote unit is allocated to a carrier wavelength sent from the central unit. WDM amounts to an extension of the diplex mode principle and is generally used to increase the bit rate capacity of an optical link or to share the link between a plurality of services or a plurality of customers. Naturally, the remote unit must have a receive filter associated with the wavelength that has been allocated to it and the central unit must be capable of emitting over each of the channels defined in the window at 1.5 µm, e.g. by means of tunable lasers.

Other electro-optical components (not shown) are used in the context of the invention, such as:

(a) Reversible components. These are light-emitting diodes (LEDs) or lasers which, depending on polarization, behave either as an emitter or else as a detector. At present, these two modes of operation are not simultaneous so it is necessary to have an electronic device to switch between the two states and to use a half-duplex or part-duplex alternating communication mode. The advantage of this type of component is that all commercially available lasers are capable of operating in this mode and coupling between components and fibers is uniform, giving rise to corresponding reduction in losses and difficulties of alignment, and can thus lead to low costs.

(b) Integrated linear diplexer components. These are monolithic linear structures having a laser cavity and a detector in alignment with a single fiber. At present these components can be used in diplex mode only.

(c) Reflection components. These components have a reception portion and a mirror portion for modulating and reflecting the incident light power. They are thus passive in that they do not generate light at the wavelength used which is the wavelength of the incident continuous signal. As a result, these components are particularly suitable for half-duplex or part-duplex modes in WDM. The operator no longer has to manage various types of remote units that are specific as to wavelength, to associate them with the correct end of the network, or to servo-control their temperature. It is the passive network which allocates wavelength to clients and it is only the central unit located in a stable climatic environment that needs to be controlled. However, temperature servo-control can be necessary in order to maintain emitted light power levels.

Finally, mention should be made of another simultaneous communication mode known as simplex which relies on two optical fibers, each being dedicated to a single direction of transmission.

In order to provide interoperability of units independently of the communication mode used, the central unit 10, 10' must be capable of identifying the communication mode of the remote unit 20, 20' with which two-way optical communication has been set up.

To this end, a method is provided for setting up two-way optical communication between the central unit 10, 10' and the remote unit 20, 20', which defines in the central unit 10, 10' a plurality of frame patterns, each being applicable to one communication mode, and in sending these frame patterns sequentially until a coherent response is obtained from the remote unit 20, 20'. The term "coherent response" is used herein to refer to a response that is known by the central unit (e.g. stored therein) and is expected based on sending a particular frame pattern. The communication mode of the remote unit is the mode that has given rise to said coherent response.

This method enables the operator:

(a) to benefit from long lifetime for the central units;

(b) to avoid any need to develop new electronics when transferring from one communication mode to another;

(c) to make the type of remote unit transparent to the operator while it is being put into service, but without that preventing the remote unit being managed once a connection is established;

(d) to automate putting future technology into operation;

(e) to renew units independently at the central unit and with customers; and (f) to be able to switch suppliers of units for the central unit without delay or inertia because of the units that have already been installed.

Figure 2A:
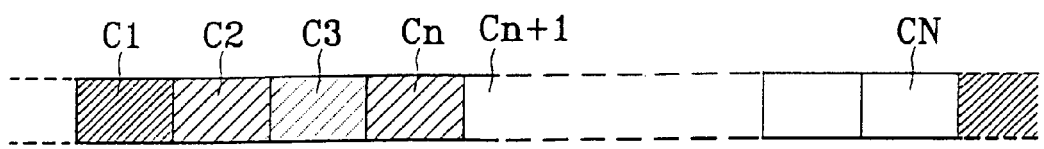
FIG. 2a shows a frame pattern suitable for implementing the method of the invention with simultaneous communication modes.
Figure 2B:
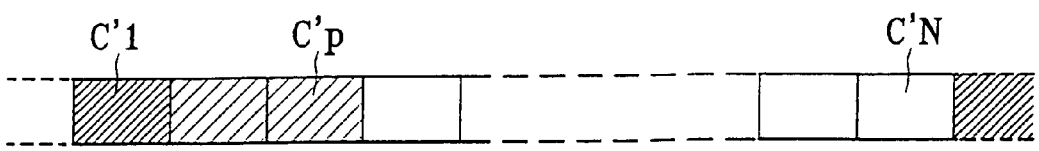
FIG. 2b is a frame pattern suitable for implementing the method of the invention with alternating communication modes.
Figure 2C:
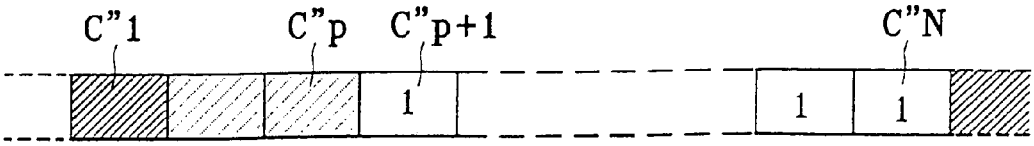
FIG. 2c shows a variant of the FIG. 2b frame pattern.

FIGS. 2a, 2b, and 2c show examples of frames applicable respectively to simultaneous, alternating, and alternating with modulated reflection communication modes.

The frame of FIG. 2a is applicable to simplex, full duplex, and diplex modes. The frame is composed of cells. A cell is a series of consecutive time slots within the frame. Each cell has its own functional role. In particular, the frame comprises a header cell C1 of the well known physical layer operating and maintenance (PLOAM) type, for example, for interchanging information between the central unit and the remote unit concerning the state of the physical layer. The following cells C2, C3, . . . , Cn are data cells and can include, where necessary, one or more cells for managing remote units, which are also well known. The central unit fills in any "empty" cells Cn+1, . . . , CN that may remain in order to maintain the presence of a clock for synchronizing the clock of the remote unit. The frame of FIG. 2a is thus complete and there is no interruption in transmission.

The frame of FIG. 2b is adapted to alternating communication modes and operates on the same principles except that it is necessary to interrupt transmission to allow the remote unit to send in turn between the interruption in transmission and the end of the frame. Information about transmission interruption can be provided in the header cell C'1 by specifying the number of cells that make up the information being downloaded from the central unit towards the customer, or it can be conveyed by an interrupt cell C'p that can be recognized by the remote unit. In the first case, the remote unit will start a counter for counting received cells and will switch to sending once it has read the number of cells announced in the header cell C'1.

Adaptation to part-duplex mode presents no particular difficulty apart from initially calculating the go-and-return propagation time so as to enable go-and-return frames to be interlaced while ensuring that alternation is maintained at the remote unit. In this case, the length of the frame is adapted as a function of propagation time.

The frame of FIG. 2c corresponds to alternating mode for a remote unit constituted by a reflection modulator. The frame is based on the principle of alternation including a portion allocated for transmission from the remote unit which consists in sending a continuous level that is subjected to on/off modulation and followed by reflection back to the central unit.

Similarly to FIG. 2b, the length of the frame can be adjusted to requirements. Orders for interrupting transmission are likewise given in a field of the header cell C"1 or via an interrupt cell C"p which is recognized by the remote unit. Cells C"p+1 to C"N are made up of 1s to be modulated by the remote unit.

Figure 3:
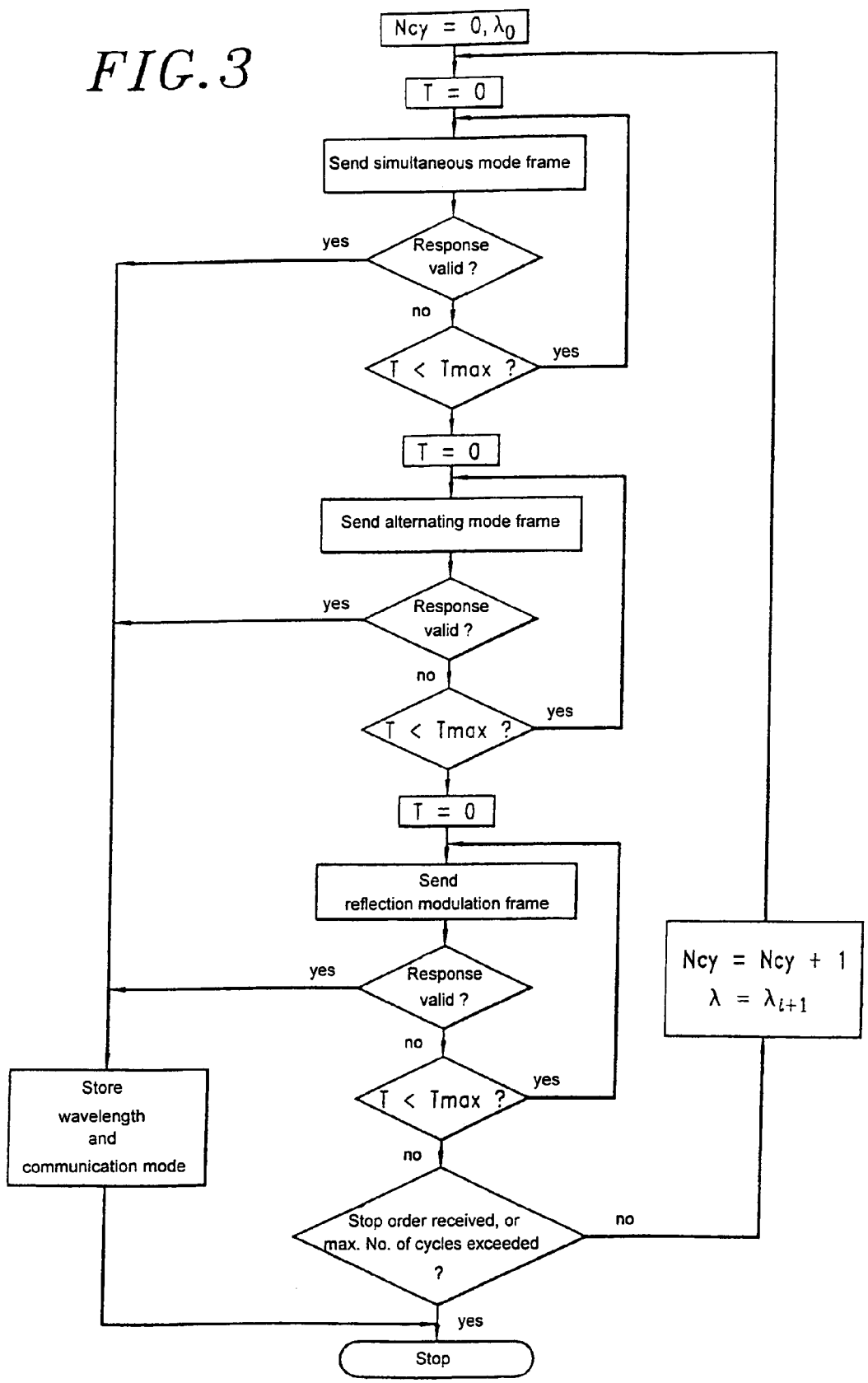
FIG. 3 is a flow chart showing the successive steps in a method in accordance with the invention.

The flow chart of FIG. 3 shows an implementation of the frames of FIGS. 2a, 2b, and 2c.

During an initialization stage, the number Ncy of search cycles is set to zero. Assuming that operation is using WDM technology in which each remote unit is distinguished by its carrier wavelength $\lambda_i$, frame patterns are sent sequentially in succession beginning with a first wavelength $\lambda_o$ selected from the emission window of the central unit.

In a first step, the central unit begins by sending a frame that is appropriate to a simultaneous communication mode (FIG. 2a) without including an emission interruption cell. If the remote unit is of the simplex, full duplex, or diplex type, then on receiving synchronization and the header cell C1, it will begin to send a continuous stream of cells to the central unit beginning with a PLOAM header cell for example and repeated at the frame rate. In all other cases, the remote unit remains silent.

If no coherent response is detected during the first step within a time lapse Tmax sufficient to enable the remote unit to cold-start, then the central unit changes frame pattern to the pattern adapted to half-duplex or part-duplex alternating mode communication (FIG. 2b). The frame begins with a header cell C'1 which, in one implementation, specifies the number of cells making up the down-frame, which is sent from the central unit to the remote unit, at which the central unit will interrupt sending and the remote unit should switch to sending its own PLOAM cell. This frame is repeated for the maximum time required for the remote unit to cold-start. If a PLOAM cell coming up to the central unit is detected during this time interval, then the central unit can optionally attempt to achieve optimization in part-duplex after measuring the go-and-return propagation time.

When no response is detected within the time allowed, there remain two possibilities: either there exists no remote unit that is active, or else such a unit exists but it operates in reflection modulation mode. The central unit then sends the third frame pattern (FIG. 2c). In the event of no satisfactory response within the time allowed for this last step, the operator can either stop the procedure or can attempt to repeat the process by increasing the number Ncy of search cycles until some predetermined maximum number is reached.

If WDM technology is used, it would also be possible to change the carrier wavelength at the end of the cycle and restart down-frame analysis. It should be observed that WDM operation is compatible with the usual techniques that make use of broadband components which will respond as soon as they receive the first wavelength $\lambda_o$. Finally, it should also be mentioned that WDM could also be taken into account by scanning through wavelengths for each type of frame pattern sent.

The sequence of steps given in the flow chart of FIG. 3 is by way of indication. It does not exclude other sequences which might be more advantageous. In particular, it can be envisaged that the central unit begins by sending a frame suitable for alternating communication modes. However, this is possible only under certain conditions, such as the following:

(a) the remote unit implements software enabling a half-duplex unit to be distinguished from a full-duplex unit so that each type can respond when addressed. Such software could be constituted merely by detecting whether or not the transmission interrupt cell or its number in the PLOAM cell of the down-frame coincides with the last cell of the frame. While the central unit is transmitting the frame, the remote unit can determine the number of cells that constitutes the frame. It is then easy to verify whether or not the interrupt cell or the number of the last payload cell (which is a cell that contains the actual data, message, information and the like to be sent) specified in the PLOAM cell coincides with the last cell of the frame. Thus, a full-duplex unit will start sending only when these numbers coincide, while on the contrary a half-duplex unit will begin sending only under opposite circumstances; or (b) a special field is used in the PLOAM cell to state explicitly which frame pattern is being used so that the remote unit knows whether or not it is authorized to send; or (c) the central unit analyzes the frame returned by the remote unit in detail. When coming into service, a full-duplex unit will generate a continuous frame addressed to the central unit, whereas a half-duplex unit will generate a continuous frame only until the frame is repeated. This method of discrimination is advantageous in that it does not impose any particular constraints or special functions on the remote units.

Figure 4:
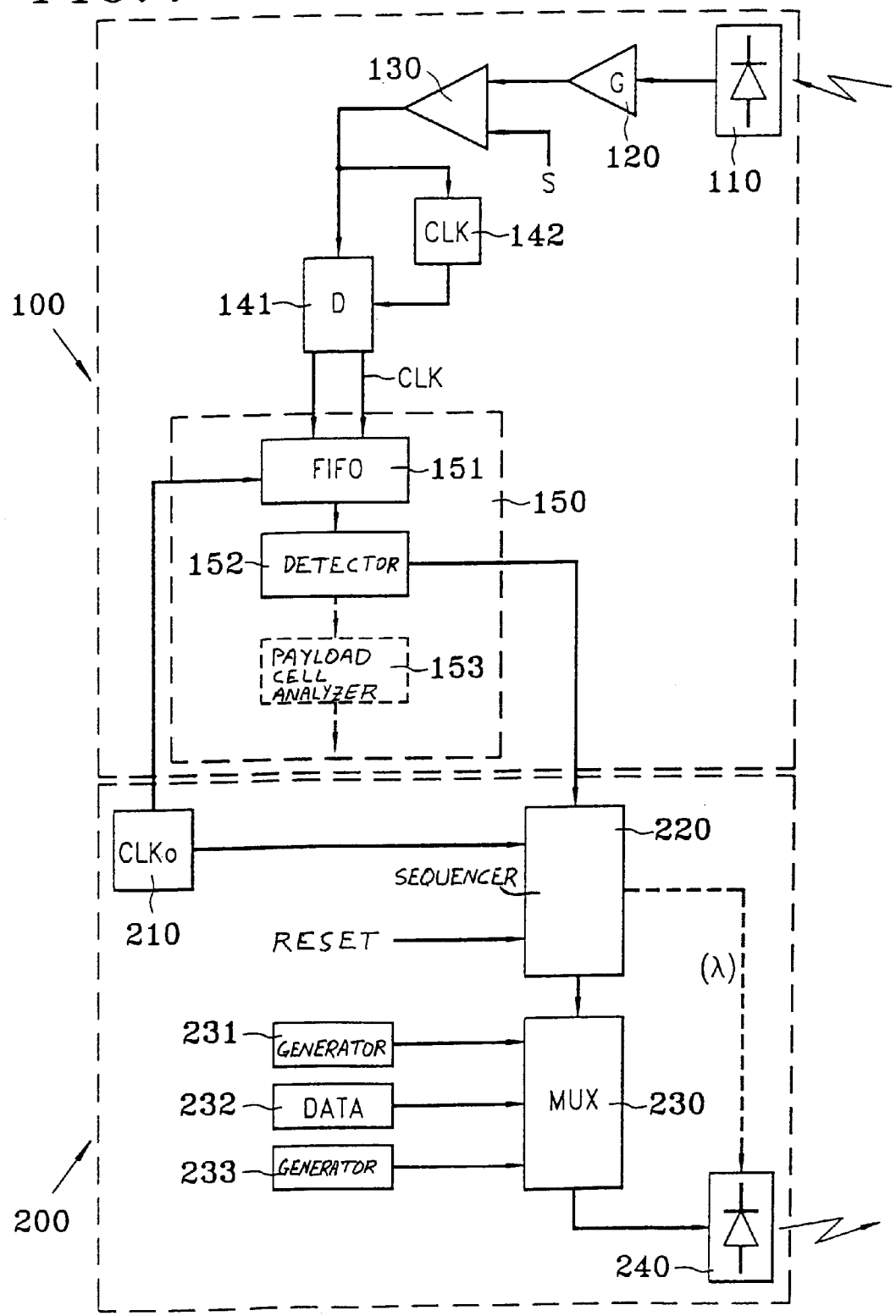
FIG. 4 is a block diagram of a central unit for implementing the method shown in the flow chart of FIG. 3.

The central unit shown in FIG. 4 comprises a receive module 100 and a send module 200.

The receive module 100 firstly comprises an optical detector 110, e.g. a photodiode, which delivers an analog signal representative of the up-frame sent by the remote unit to the central unit. After being amplified in a fixed gain amplifier 120, this signal is transformed into a logic signal by a comparator 130 having a threshold S. The clock of the remote unit as recovered by a circuit 142, and the logic signal are both applied to a bistable D which outputs both the recovered clock and the data of the up-frame. These two signals are received by a frame detector 150 constituted by a first-in-first-out (FIFO) circuit 151 which accommodates phase differences between the remote clock and the central clock 210, and by a cell detector 152 suitable for establishing that the structure of the received frame matches the expected structure. The detector 152 sends a message to the send module 200 causing it to stop the search sequence and store the up-frame, or on the contrary causing it to continue searching. In an option, the frame detector 150 can include a payload cell analyzer 153 for extracting any data from the frame that needs to be processed by the central unit.

The send module 200 has a sequencer 220 which contains the overall algorithm of the method and which generates synchronization for the up-frame. A multiplexer 230 serves to generate the various frame patterns on the basis of the synchronization received from the sequencer 220, a generator 231 for generating beginning-of-frame cells and end-of-frame cells, a generator 232 for generating data, if any, and a generator 233 for generating empty cells or cells at the level of a 1 bit. The frame as built up in this way is then applied to a laser emitter 240.

It should be observed that if the WDM technique is used, the sequencer 220 will control wavelength scanning by the laser 240 by varying its bias current or its temperature.

The invention claimed is:

1. A method of setting up two-way optical communication between a central unit and a remote unit suitable for operating in a given communication mode selected from a plurality of communication modes, comprising:
defining a plurality of frame patterns in the central unit, with each frame pattern being appropriate to one of said communication modes;
sending said plurality of frame patterns sequentially from the central unit to the remote unit until a coherent response is obtained at the central unit from said remote unit; and
selecting as the given communication mode to be used by the central unit for two-way optical communication with the remote unit that which corresponds to the frame pattern which gave rise to said coherent response from the remote unit;
wherein the plurality of communication modes comprises simultaneous communication modes and alternating communication modes.

2. A method according to claim 1, wherein the simultaneous communication modes comprise simplex, full duplex, and diplex modes.

3. A method according to claim 1, wherein the alternating communication modes comprise half-duplex and part-duplex modes.

4. A method according to claim 1, wherein the frame pattern appropriate to simultaneous communication modes is constituted by a complete frame, without any interruption of transmission.

5. A method according to claim 1, wherein the frame pattern appropriate to alternating communication modes is constituted by a down frame including an interruption in transmission in order to enable the remote unit to send between the interruption of transmission from the central unit and the end of the frame.

6. A method according to claim 5, wherein the remote unit is a reflection modulator and the frame consists, after transmission has been interrupted, in sending a constant level to be modulated and reflected by said remote unit.

7. A method according to claim 5, wherein the interruption in transmission is defined by an end-of-frame cell for the down-frame.

8. A method according to claim 7, wherein the position of the end cell of the down-frame is given by a frame header cell.

9. A method according to claim 7, wherein the end cell of the down-frame is recognized by the remote unit.

10. A method according to claim 4, wherein a frame header cell includes a special field specifying the frame pattern used.

11. A method according to claim 1, wherein the remote units are distinguished by wavelength, and the step of sending the plurality of frame patterns sequentially is performed in succession at each remote unit wavelength until said coherent response is obtained.

12. A method according to claim 1, wherein the remote units are distinguished by wavelength, and the step of sending the plurality of frame patterns sequentially is performed in succession at each remote unit wavelength for each frame pattern until said coherent response is obtained.

* * * * *